June 17, 1930.  H. C. GRAVES, JR  1,764,297
PILOT WIRE PROTECTIVE SYSTEM
Filed Nov. 21, 1927   5 Sheets-Sheet 1
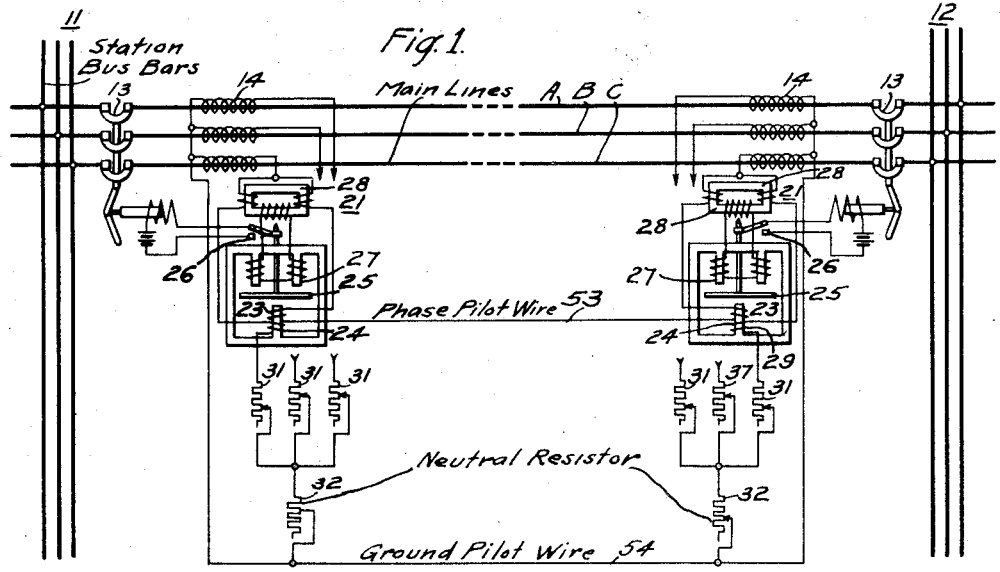
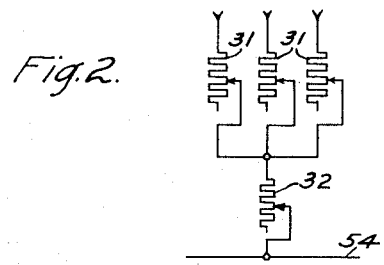
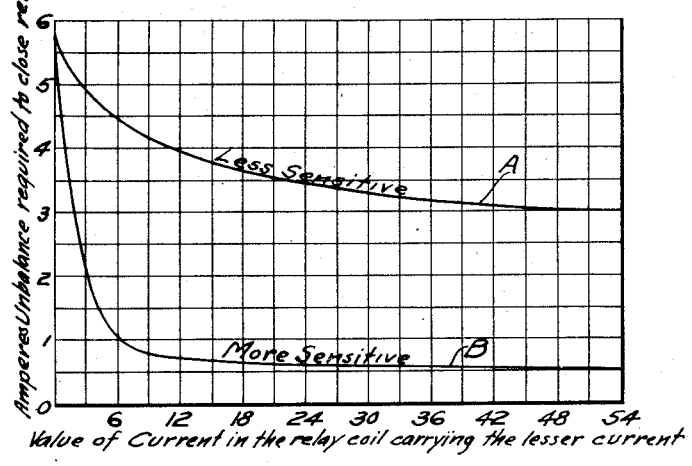
INVENTOR
Herbert C. Graves Jr.
BY
ATTORNEY

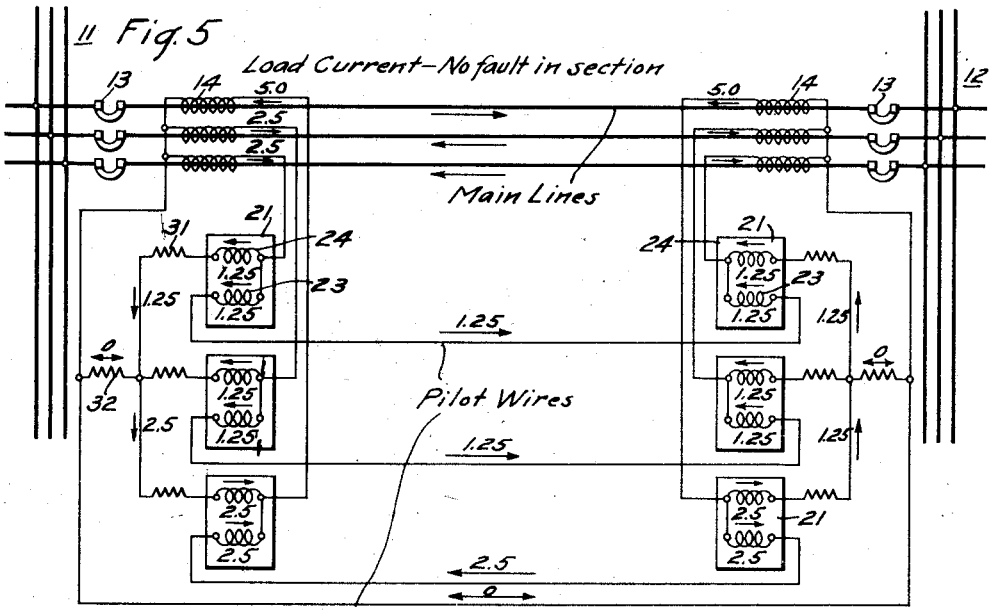

Characteristic Distribution of Currents for Normal Conditions
Current Values shown are instantaneous values.

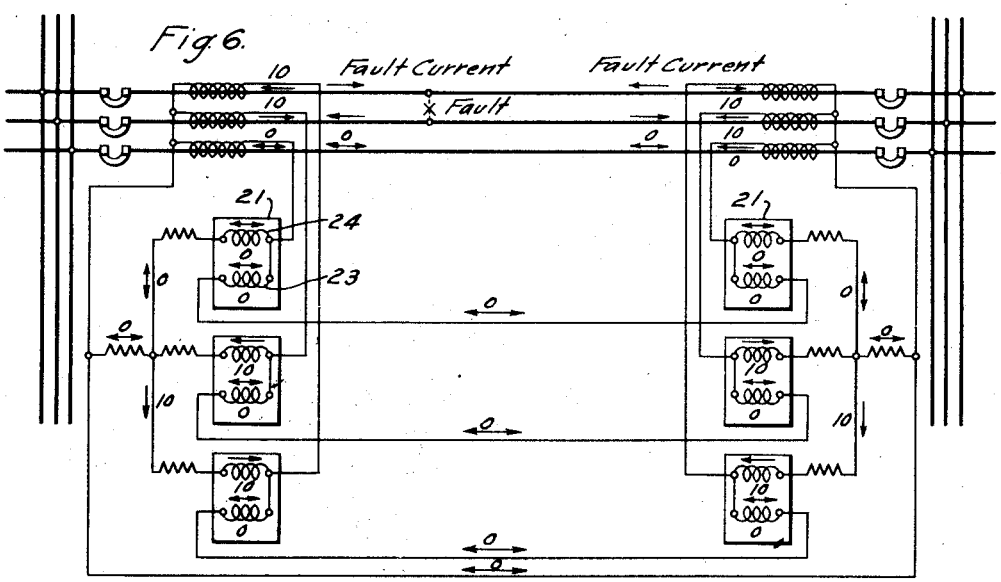

Characteristic Distribution of Currents for Case of Phase to Phase Fault
with Equal Currents Fed from Both Ends of Section.
Note:- Current in Pilot wires is zero because
voltage at the ends are equal and opposite
in direction.

INVENTOR
Herbert C. Graves Jr.
BY
ATTORNEY

June 17, 1930.  H. C. GRAVES, JR  1,764,297
PILOT WIRE PROTECTIVE SYSTEM
Filed Nov. 21, 1927   5 Sheets-Sheet 4

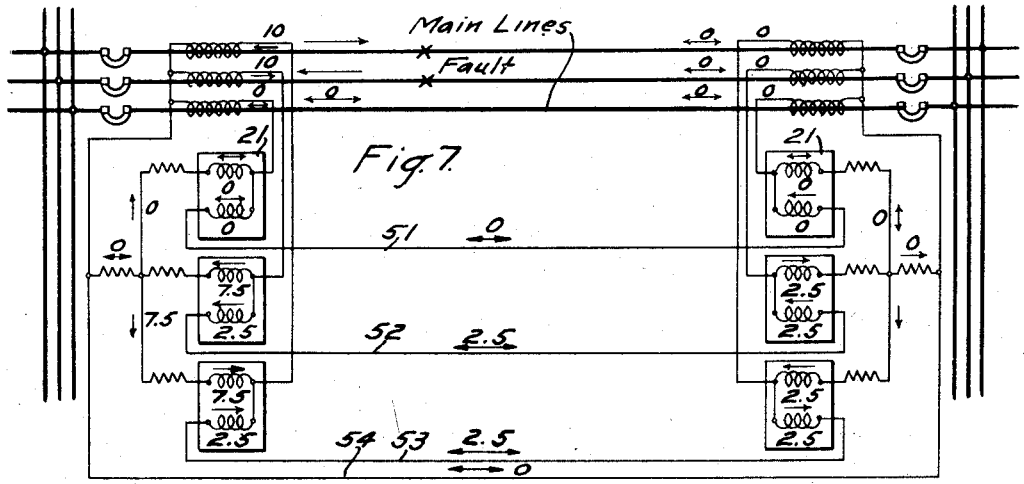

Characteristic Distribution Of Currents for Case of a Phase to Phase Fault with Fault Current Fed from One End Only.
Note:- Let the pilot wire impedance be X. Then the balancing resistors should each be equal to ½X. Therefore, the current transformer secondary current will have two paths in parallel, one consisting of two balancing resistors or (2×½X =X) and the other consisting of two pilot wires plus two resistors or (2X+2×½X=3X). Therefore the currents will divide in the proportion of 3 to 1.

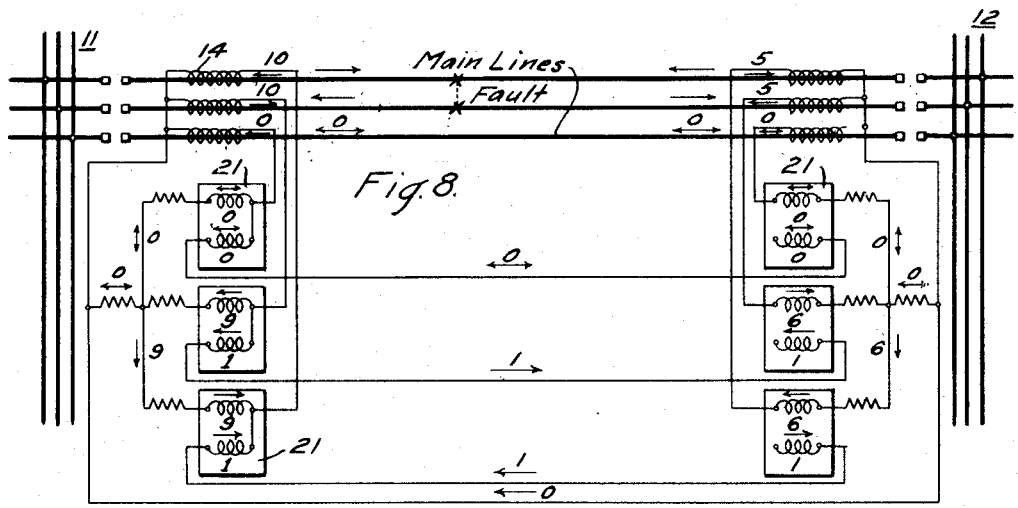

Characteristic Distribution of Currents for Case of a Phase to Phase Fault with Twice as much Fault Current Fed from one end as from the other.
Note:- The actual division of currents between resistors and pilot wires will depend somewhat upon current transformer characteristics for the above case, but the above may be taken as an average example.
This Fig. illustrates condition intermediate between Fig. 6 and Fig. 7.

INVENTOR
Herbert C. Graves Jr.
BY
[signature]
ATTORNEY

June 17, 1930.  H. C. GRAVES, JR  1,764,297
PILOT WIRE PROTECTIVE SYSTEM
Filed Nov. 21, 1927  5 Sheets-Sheet 5

Fig. 9.

Characteristic Distribution of Currents for Case of a Single Phase to Ground Fault within the section. Equal Currents Fed from Each End of the Section

Fig. 10.

Characteristic Distribution of Currents for Case of a Single Phase to Ground Fault on an Adjacent Section.
Note:— If the neutral resistors were omitted, the relay currents would divide in the proportion of 3 to 1 and thus cause incorrect operation INVENTOR
Herbert C. Graves Jr.
BY
ATTORNEY Patented June 17, 1930

1,764,297

UNITED STATES PATENT OFFICE

HERBERT C. GRAVES, JR., OF VERONA, PENNSYLVANIA, ASSIGNOR TO WESTINGHOUSE ELECTRIC & MANUFACTURING COMPANY, A CORPORATION OF PENNSYLVANIA

PILOT-WIRE-PROTECTIVE SYSTEM

Application filed November 21, 1927. Serial No. 234,648.

This invention relates to pilot-wire protective systems and circuit-breaker control systems, and particularly to pilot-wire protective systems of the circulating-current type.

The principal objects of this invention are as follows:

To provide a pilot-wire protective system and a circuit-breaker control system of the circulating-current type.

To provide a protective system which shall be relatively sensitive to fault conditions on the power system.

A protective system utilizing an induction-disc-type differential relay of dual sensitivity.

A protective system utilizing a differential relay in the neutral circuit to provide greater sensitivity in case of a ground fault on the power system.

A protective system wherein the volt-ampere burden on the main-line current transformers is of relatively small magnitude.

A protective system wherein the potentials applied to the secondaries of the main-line current transformers are of relatively small magnitude.

A protective system wherein the relays may be so adjusted that an open circuit in the pilot-wire system shall not cause false interruption of the main lines, under normal conditions of operation, but which shall still be effective to interrupt the main lines when a fault condition occurs relative to the main lines, either within or without the section of line thus protected. In other words, the arrangement shall be selective as to a fault condition relative to the main lines; and shall not be rendered ineffective by an open-circuit condition in the pilot-wire system, although selectivity may be lost thereby.

A protective system utilizing balancing impedance devices or resistors which provide a relatively perfect balance for any type of power system through fault and yet which need not be so precisely balanced as in other systems heretofore used.

A protective system utilizing an impedance device or resistance means in the neutral circuit for the purpose of obtaining relatively great sensitivity and selectivity.

A protective system in which the current-transformer characteristics at the two ends of a line to be protected need not be exactly alike and yet provide a system which shall be of such selectivity that only a faulty section will be isolated and the non-faulty remain uninterrupted.

A protective system in which the effect of potentials induced in the pilot-wire system is negligible.

A protective relay for a pilot-wire protective system in which the characteristics of the relay are such that the differential current required to cause actuation of a circuit interrupter is of relatively small magnitude when the direction of current in one of the relay coils is reversed relative to the direction of the current in the other coil of the same relay.

A protective system which shall automatically become more sensitive to the smaller value of fault current when the magnitudes of the fault currents fed from the two ends of the section are different.

A protective relay which, when located at the end of the faulty section which is supplying the smaller value of fault current, automatically becomes more sensitive.

A protective system which shall isolate ground faults with relatively great rapidity and which shall be of relatively great sensitivity to ground faults.

To provide a means connected in the neutral circuit which may be so adjusted as to permit its associated relays to be set very sensitively without faulty operation when a fault current from some other part of the power system passes through the section protected.

To provide a protective relay system which shall be responsive only to excess current passing through its associated balancing impedance devices as a result of line-to-line or line-to-ground faults.

A protective system which shall permit such adjustment of the current division as to prevent false operation of circuit interrupters, due to changes in the impedances of the pilot wires not unreasonably large.

A protective system for a three-phase power system utilizing four impedance devices or resistors associated with each end of the section to be protected, for compensating for all types of power-system faults.

To provide a protective relay, the pilot wire coil of which is a restraining coil and not an operating coil.

A pilot-wire protective system having relays responsive to a differential current between an operating coil which is connected to a balancing resistor circuit and a restraining coil which is connected to a pilot-wire circuit.

There are several objections to the pilot-wire protective systems heretofore used, the principal objections or disadvantages of which are as follows, and all of which are obviated by this invention:

Heretofore, there have been rather narrow limits to the length of the pilot wire that could be used because the sensitiveness of the protective system decreased as the length was unduly increased unless the size of the pilot wire was increased by a prohibitive amount. In this invention, the length of power line to be protected may be materially increased because of the smaller burden it imposes upon the current transformers for the same length of pilot wires.

Heretofore, an open circuit in the pilot wire resulted in tripping the circuit breakers. In this invention, an open circuit in a pilot wire does not result in such false operation of the circuit breakers, but an indication will, nevertheless, be given as to the existence of such an open circuit in a pilot wire. This effect is obtained in the following manner. An open circuit in a pilot wire will cause the total current transformer current to flow through the operating coil of the relay. However, the characteristics of the relay are such that, when current flows through one coil only, a current equal to twice the value of the relay current tap used is required in order to cause operation. By using a current tap, the value of which is equal to somewhat more than one-half of the full-load current, the relay will still be ineffective if a pilot wire is opened. Whenever a fault occurs, either within or without the section of line on which these relays are installed, the increased magnitude of the current will cause the relays to operate.

Heretofore, differences in the charging currents at the two ends of the line might cause false tripping of the circuit breakers when a fault of large magnitude occurred in some other section of the power system. With this invention, such charging currents will not cause false interruptions of the non-faulty power sections because the balancing resistors can be adjusted so that there is a slight normal restraint for those installations where the characteristics of the power system are such as to make possible considerable differences in charging current at consecutive stations.

Heretofore, induced voltages from neighboring circuits might falsely trip the circuit breakers of the protected section of the power system. With this invention, such induced voltages will not cause such false operation because the current due to the induced voltage will flow through the two relay coils in series. Since each coil will still carry the same current, the relays will remain inoperative or ineffective.

Heretofore, in circulating current schemes, each main-line current transformer normally had a low voltage on its secondary, but, in case of a through short circuit or while the circuit breaker was being opened in isolating a local fault, the voltage might become of large magnitude. With opposing-voltage schemes, the voltage on the current transformers is normally very high. With this invention, such high voltages do not occur upon the secondaries of the main-line current transformers because of the relatively lower impedance of the relay with its associated resistor. For the ordinary circulating-current scheme, it was necessary to make either the impedance of the relay circuit, or the relay current tap setting, so high that sufficient current to operate the relay would not flow through the relay circuit even when a fault outside of the protected section caused high values of current to exist. Thus, the ordinary circulating-current scheme either sacrificed sensitivity because of the high current tap setting or caused a high voltage to exist on the current transformer terminals because of the high impedance of the relay circuit.

Heretofore, a balancing neutral resistor or impedance device connected in the neutral circuit to the ground pilot wire has not been utilized, and, consequently, faulty isolation of a local non-faulty section was liable to occur when a fault occurred in some other section of the power line unless the sensitivity of the relays was considerably reduced by increasing the resistance in the balancing resistors. This resulted in producing an overbalanced restraining torque on the relay under normal conditions. With this invention, however, by the utilization of such a balancing neutral resistor, the relays may be adjusted very sensitively and yet, at the same time, a perfect selectivity may be obtained to isolate the faulty section only and leave undisturbed the non-faulty section of the power system. In other words, the neutral resistor causes the control current to divide equally between the two relay coils for any type of fault which occurs outside of the protected section, and permits the relays to be set very sensitively without resulting in false operation of the circuit breakers.

Heretofore, relays have been used which operated upon an unbalance of the current in the protective system and which required a precise setting of the adjusting resistors associated with the relays. With this invention, however, a relay is utilized which operates only upon an excess current through the adjusting resistors and, consequently, it is possible to avoid the exact precision heretofore required in the setting of resistors. If the pilot-wire impedance is known only approximately or if it will increase appreciably, due to temperature or for any other reason, the value of the balancing resistor is made slightly higher than the value which would be used if a definite and constant value for the pilot-wire impedance were known. This does not cause the relay to operate or tend to operate, but merely places a slight overbalanced restraint upon it.

This is a pilot-wire protective system of the divisional-circulating-current type. Means having a neutral connection, in the form of the usual current transformers, are provided for obtaining a control current proportional, in direction and magnitude, to the current flowing in the main power conductors. Such current transformers for a three-phase power system are preferably three in number at each end of the power line section to be protected.

Phase pilot wires are provided and are associated with each of the main power-line conductors or phases and also an additional pilot wire, called a ground pilot wire, is provided, all of the pilot wires running the length of the power section to be protected. Associated with each of the main conductors or phases is a balancing circuit in which is located a resistor or impedance device for balancing the division of control currents between the pilot wire and the balancing circuits.

In addition to the impedance devices already mentioned, is provided another special impedance device connected to the neutral connection of the current transformers and also to the balancing circuits. The purpose of the special impedance device is principally to so arrange the distribution of the control currents, produced by a fault in a section adjacent to or other than the section under protection which is non-faulty, that faulty operation of the circuit interrupters in the non-faulty section is prevented. A relay responsive to the division in control currents or to the excess of control currents in one of its differential windings is provided for controlling the circuit interrupters. The relay is so arranged that it automatically provides a plurality of degrees of sensitivity, dependent upon the relative direction of flow of current through its differential windings.

This protective system is a pilot-wire protective system of the divisional-circulating-current type, wherein the burden imposed on the line-current transformers is relatively small. When applied to a three-phase power system, this scheme is novel in that four balancing resistors or impedance devices are utilized instead of three, with the result that balanced conditions are maintained, irrespective of whether a through fault or a fault outside of the protected section, is phase-to-phase or phase-to-ground. This permits the use of ground relays having a low-current setting, thus increasing the sensitivity of the protection. However, for applications where ground-fault protection is not desired, the ground relays, but not the neutral balancing resistors, may be omitted.

If the usual ten-to-one ratio insulating current transformers connected in the pilot wires be utilized, this protection may be applied to lines of relatively great length because of the effective low impedance of the pilot wires. For shorter lines where the pilot-wire impedance is of relatively small magnitude, the insulating current transformers may be omitted unless they are required for protection against high voltages. With insulating current transformers of the ratio named, each of the line balancing resistors may be equal to 1/200 of Z, the pilot wire impedance, plus the impedance of the insulating current transformers; but the neutral balancing resistors should be equal to 1/200 Z only.

Another novel feature of this protective system is in the characteristics of the selective differential relay which is utilized. The relay design is such that, when a fault occurs in a section protected by this pilot-wire scheme, the circuit breaker, through which the maximum current is flowing, will automatically operate on one sensitivity characteristic of the relay and that through which the minimum current is flowing will automatically be responsive to the relay characteristic of greatest sensitivity. As a result, that breaker which would have the least tendency to trip, in arrangements heretofore used, operates in this system on the most sensitive characteristic of the relay.

The dual-sensitivity characteristics of the selective differential relay utilized in this protective system makes it suitable for protection of parallel lines. When the operating conditions of the relay are such that the currents flowing through its two coils are in the same direction, the indications are that the fault is near the other end of the power line, and the relay operates on its least sensitive characteristic, as shown in curve A of Fig. 3. When the currents through the two coils of the relay are in opposite directions, the indications are that the fault is close to that particular relay. This relay then operates on its sensitive characteristic shown in curve B of Fig. 3 and thus permits the relay to be installed at stations where only a small amount of feed-back is available. If the relay operations at both ends of the line are not simultaneous, the opening of a breaker by one set of relays permits the other set of relays to operate on the more sensitive characteristic curve.

Figure 1 is a diagram illustrating this protective system including the differential relay utilized in this invention arranged to obtain double sensitivity dependent upon the relative directions of flow of the currents in its differential windings.

Fig. 2 is a diagram illustrating the special impedance device utilized in this invention for maintaining a definite ratio of control current distribution.

Fig. 3 is a graph illustrating the characteristic curves of the special relay when operated upon its double sensitivity characteristics.

Figure 4:
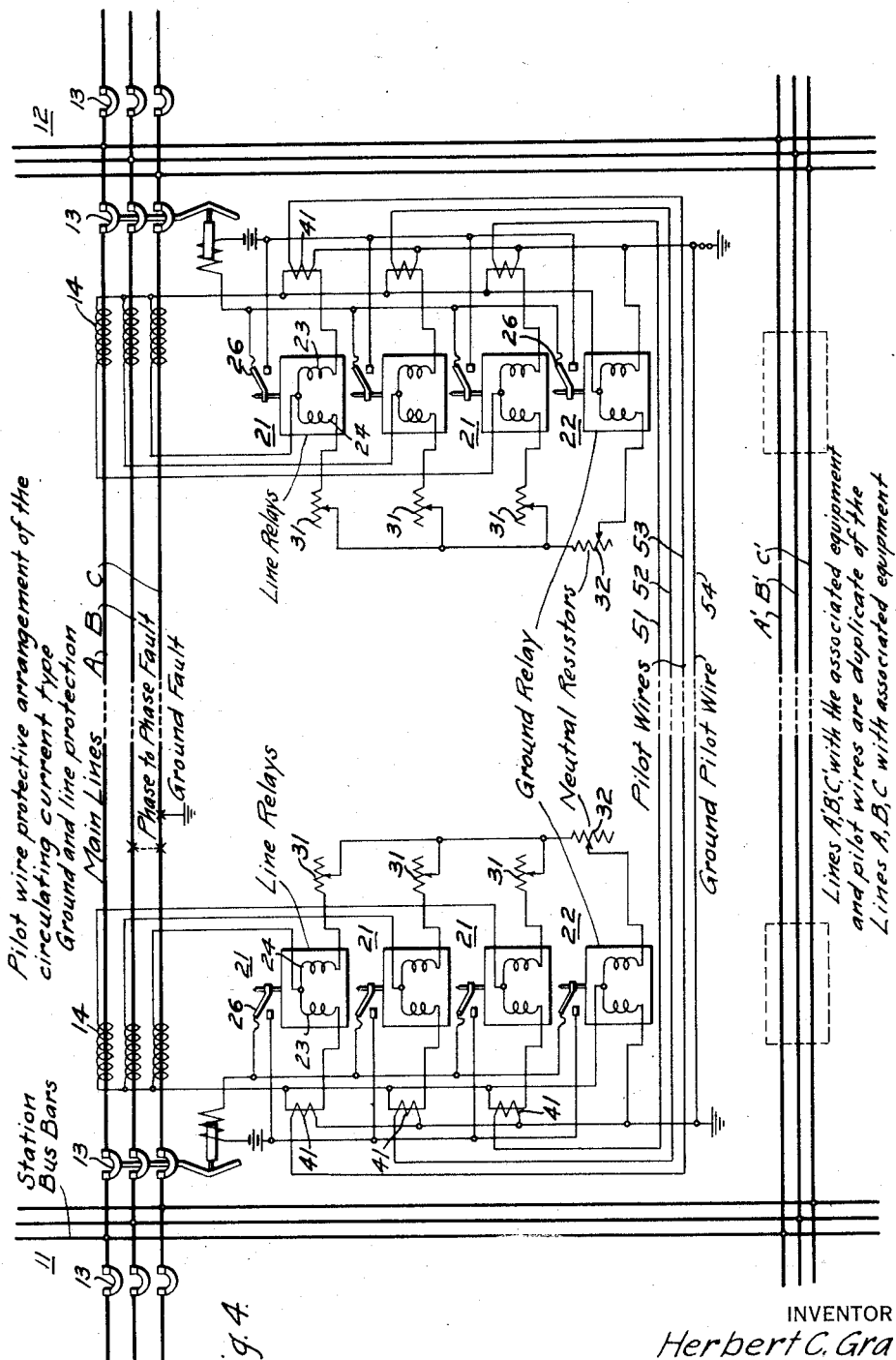
Fig. 4 is a diagram illustrating this pilot-wire protective system of the circulating-current type applied to a three-phase power system and adapted for both ground and line protection.

Figs. 5 to 10, inclusive, are diagrams, in schematic form, illustrating the distribution of current in the pilot-wire and control system under various conditions of faults.

Fig. 5 is a diagram illustrating the characteristic distribution of the control currents under normal conditions, that is to say, with no fault on the section to be protected of the power system. It also illustrates the distribution of currents for the case of a balanced three-phase fault outside of the section shown.

Fig. 6 illustrates the characteristic distribution of control currents in case of a phase-to-phase fault with equal currents fed from both ends of the faulty power section.

Fig. 7 is a diagram illustrating the characteristic distribution of control currents for the case of a phase-to-phase fault with the fault current fed from one end only of the faulty section.

Fig. 8 is a diagram illustrating the characteristic distribution of control currents for the case of a phase-to-phase fault with twice as much fault current fed from one end of the faulty section as from the other end. It also illustrates a reversal of the relay currents at the end of the section fed by the smaller magnitudes of fault currents whereby the arrangement automatically becomes more sensitive.

Fig. 9 is a diagram illustrating the characteristic distribution of control currents for the case of a phase-to-ground fault within the faulty section and with equal fault currents fed from each end of the section.

Fig. 10 is a diagram illustrating the characteristic distribution of control currents for the case of a phase-to-ground fault on an adjacent section. It also illustrates the novel protection afforded by utilization of the neutral resistors or impedance devices.

By way of example, this protective system will be described with reference to Figs. 1 and 4.

The devices represented by 11 and 12 are station bus bars of a three-phase power system. The purpose is to furnish a source of main power to the power conductors A, B and C between the stations 11 and 12. The source of main current may be an alternating-current power system of any type and, with modifications, a direct-current power system. The power system may be of the overhead type or of the underground type and may be a grounded or an ungrounded power system. This protective system may also be applied to the protection of the apparatus acting as a source of power, such as generators or transformers, but, by way of example, it will now be described with reference to a three-phase grounded power-transmission system only.

The device 13 is a circuit interrupter or circuit breaker of the usual type or means for isolating the main line conductors A, B and C from the rest of the power system.

The device 14 is a current transformer having its primary winding connected in one of each of the main-line conductors A, B and C near the ends thereof and having the secondaries connected to a pilot-wire system to be described later. The devices 14 are current transformers of the usual type. They are preferably arranged, as shown, in star connection. The purpose of the transformers 14 is to supply current to the pilot-wire system which, in magnitude and direction, is proportional to the currents in the main conductors to which they are respectively connected.

The relay 21 is preferably an induction type, alternating-current, balance relay comprised of two windings 23 and 24 acting through a common magnetic circuit on a single disk 25, the direction of motion of which is dependent upon which of the currents in the two windings 23 and 24 predominates. The relay is equipped with a torque compensator or saturation transformer 28, as illustrated in Fig. 1, and is of essentially the same construction whether it be used as a line relay 21 or a ground relay 22 (Fig. 4). The relay operates on the induction principle, responsive to an unbalanced current or excess current between its two windings 23 and 24. In effect, the relay has two overload elements 23 and 24 acting in opposition upon a common disk 25 through a common magnetic circuit. The two elements 23 and 24 are electrically opposed and, under conditions of balanced current through its two windings, the fluxes in either the lower pole 29, or in the saturation transformer 28 of the relay are equal and opposite, giving a resultant zero torque on the relay disk 25. From the Figure 1, it may be seen that the windings 23 and 24 on the lower pole 29 are opposed and that the windings on the torque compensator 28 are additive in effect, when each has a normal flow of current. The upper poles 27 are fed or energized from the torque compensator or the saturation transformer 28 which, at the same time, serves to give the relay a definite minimum time characteristic. The moving element 25 consists of a solid aluminum disk fastened to the same shaft as the moving contact of the two contacts 26.

Under the normal conditions of balanced currents flowing in the two windings 23 and 24, as shown in Fig. 5, for example, no flux is produced in the main pole 29 because the windings 23 and 24 balance each other, and, consequently, there is no torque upon the disk 25. If, however, the currents in the two windings 23 and 24 become unbalanced so that the current in the winding 24 exceeds that in the winding 23, such differential current produces a flux in this main pole; and, by the interaction of this flux with the flux in the upper poles due to the current supplied from the saturation transformer 28, the operation of the relay results in closing of the contacts 26.

The action is substantially the same regardless of the relative direction of the currents in the windings 23 and 24, although the relay automatically becomes more sensitive for one direction of current relative to the other. When the direction of one relay coil current becomes reversed with respect to the direction of the other coil current, as is shown for the relays associated with the bus 12 in Fig. 8, the fluxes produced by the two currents will be additive in the main pole 29 and subtractive in the torque compensator 28. Since the value of ampere turns which will cause saturation of the main pole 29 is different from that which will cause saturation of the torque compensator 28, the relay will operate on different characteristics for the two cases. Curve A of Fig. 3 illustrates the sensitivity characteristic of the relay when the directions of currents are such as to be additive in the torque compensator 28, while curve B shows the sensitivity characteristic when the currents are subtractive in the torque compensator 28 and additive in the main pole 29.

This relay operates on current alone and no source of potential is required. This is an advantage, particularly on high-voltage lines where the cost of potential transformers may be considerable. Also, there are no phase relations to be considered in connecting up the relay.

On this three-phase system are three such relays associated with each end of the section 11—12. These relays are constructed to be ineffective under balanced conditions of current in the coils 23 and 24, the effects of which are in opposition. In broad terms, the relays are means responsive to current from the respective current transformers 14 for the purpose of controlling the circuit interrupter 13 upon the occurrence of an unbalance in current in the coils 23 and 24 produced by a fault connection relative to the main-line conductors.

The device 22 shown in Fig. 4 is a relay similar in construction to that of the device 21 already described except that it is a relay of more sensitive type and that it is connected to the ground pilot wire 54, as illustrated. The purpose of this relay is to permit greater sensitivity in operation upon the occurrence of a ground fault, because it operates upon smaller unbalances or differences in the distribution of currents between the coils 23 and 24.

The devices 31 are resistors or impedance devices or means for placing resistance or impedance in the connections between the relays 21 and the pilot wires 51 to 54, inclusive. The purpose of the resistors is to cause the currents in the relays to divide equally between the two coils 23 and 24, under normal operating conditions. The resistors are adjusted to have resistance equal to one-half the impedance of the pilot wire, when the insulating transformers 41 are not utilized, and, when the insulating transformers 41 are utilized, the adjustments of the resistors 31 must be made to take care of the additional effects of the utilization of the insulating transformers upon the impedance of the pilot-wire system. In broad terms, the devices 31 are means for balancing the distribution of currents between the coils 23 and 24 of the relays 21.

The device 32 is a resistor or impedance device associated with the ground relay 22. Its purpose is to cooperate with the resistors 31 to balance the distribution of currents between the coils 23 and 24 of the ground relay 22, under normal conditions, and to maintain the balance when a through fault occurs. No current flows in this resistor 32 in the absence of a ground fault or, in other words, the currents of a short circuit or of a phase-to-phase fault have no effect upon the resistor 32 or its associated relay 22. The principal purpose of the resistor 32 is to obtain greater sensitivity and selectivity in adjustments of the system for protection against a ground fault upon the main lines. This is a novel feature.

The devices 41 are current transformers, of the usual type, for the purpose; first, of insulating the local relay wires from high potentials which might be induced upon the pilot wires produced by induction from the transmission lines or by lightning disturbances, and second, to effect the decrease of impedance of the pilot wires and thus permit longer sections of main lines to be protected without overloading the current transformers 14. In broad terms, they are one means for permitting the pilot-wire type of system to be utilized effectively on longer transmission lines.

In order to explain the operation, and point out the important advantages of this protective relay pilot-wire scheme, simple diagrams, Figs. 5 to 10, inclusive, showing only the essential elements of the scheme and arrangement, are presented. In these diagrams, the magnitudes and directions of the currents in various parts of the protective circuit are shown, both for normal conditions and for a number of representative fault conditions. For the main-line currents, the directions only have been shown. It has been necessary to assume values for the secondary currents, and the corresponding magnitudes of main-line current, of course, will depend upon the current-transformer ratios assumed at the two ends of the section 11—12. The current transformers 14 at both ends of the section 11—12 are assumed to have similar ratios and characteristics. For the purpose of illustrating the distribution of current, the magnitude of the total secondary current is immaterial. Consequently, convenient and representative values have been chosen.

In order to simplify the drawings, (Figs. 5 to 10, inclusive), the ground relays 22 have been omitted. These are not essential to the operation of the scheme but they provide much more sensitive protection against ground faults when used. If used, they should be inserted at the juncture of the ground pilot wire 54 and the neutral balancing resistors 32, as is shown by the drawing (Fig. 4). The relays 21 are shown schematically, and the trip circuits have been omitted. Also, the insulating current transformers 41 have been omitted. These transformers 41 may be used when it is desired to insulate the relay circuits from high voltages which might exist on the pilot wires 51, 52 and 53, due to induction from neighboring transmission lines or to atmospheric disturbances, or where it is desired to reduce the effective impedance of the pilot wires. When the insulating current transformers 41 are used they should, of course, have similar ratios and characteristics at both ends of the section. A common ratio is 10 to 1, or 5 to .5 amperes.

In the following discussion, the impedances of the four pilot wires 51, 52, 53, 54 have all been assumed to be equal. This is not essential to the operation of the scheme, since the balance resistors 31 and 32 may be adjusted to take care of differences in the pilot-wire impedances. The resistance of all the four balancing resistors 31 and 32 at one end of the section 11 or 12 may be equal if the pilot-wire impedances are equal. Each resistor is preferably made equal to one-half of the impedance of its respective or associated pilot wire.

Case I. The characteristic distribution of current for normal conditions

Case I, Fig. 5, illustrates the division and direction of control currents in the relays 21 for normal operating conditions, i. e., when the main-line currents at each end of the section 11—12 are equal and in the same direction. Therefore, this case will also serve to illustrate the distribution of currents for the condition of a three-phase fault in some section neighboring to the section 11—12. For the latter case, the magnitudes of the currents would usually be greater but this would result merely in a proportionate increase in each of the currents shown. Instantaneous current values are shown; therefore, the current going out on one phase is equal to the sum of the currents returning on the other two phases.

Since a balanced three-phase load has been assumed in this case, there is no residual current. Consequently, there is no current in the neutral balancing resistor 32 or in the ground pilot wire 54. Neglecting the volt-ampere burden of the relays 21, the burden on each current transformer 14 consists of one balancing resistor 31 and one-half of one pilot wire. Since each resistor 31 has been made equal to one-half of the impedance of one pilot wire, the two burdens are equal. Therefore, the current-transformer secondary current will tend to divide equally between the two coils 23 and 24 of its relay 21, provided that the direction of current at the other end of the section is not such as to oppose the flow of current along the pilot wire. Examination of the drawing (Fig. 5) will show that, for this case, the currents in the two ends of the section 11—12 do not oppose but tend to circulate over the pilot wires. Consequently, the secondary current of each current transformer 14 will divide equally between the two relay coils 23 and 24, and the relays 21 will remain ineffective.

Case II. Characteristic distribution of currents for case of a phase-to-phase fault with equal fault current fed from each end of the section For this case, which is represented by Fig. 6, it is assumed that the load current is zero. Consequently, there is no current in one phase, and equal fault currents flow in the other two phases. By comparing the current directions for this case with those shown by the arrows in Case One, it is apparent that the direction of current flow is now reversed at one of the two stations. Therefore, the voltages in the two ends of the pilot wire are opposed; and, since the current-transformer primary currents are equal, these opposing voltages are equal. As a result, no current can circulate through the pilot wires; and the total secondary current must flow through one coil of the relay 21. Consequently, the relays 21, at both ends of the section 11—12, will operate and be effective to open their respective circuit breakers 13.

*Case III. Characteristic distribution of currents for case of a phase-to-phase fault with fault currents fed from one end only*

The conditions assumed for this case, which is represented by Fig. 7, may exist if the system is so connected that the power can flow in only one direction in the section 11—12. It will also exist if the circuit breaker 13 at one end of the section 11—12 is opened before the circuit breaker 13 at the other end of the section has opened. In other words, we may assume that, for Case II, the breaker 13 at the right hand end of the section 11—12 opens before the breaker at the other end opens. The condition shown in Case III will then exist.

For the case thus resulting, there will be no voltages at the right hand end of the section to affect the control-current distribution, and, consequently, the control-current division will be inversely proportional to the impedances of the two paths. It should be mentioned at this point that the impedances of the relays have been neglected in our discussion of the several conditions assumed. Since these impedances are actually very low, they may be neglected without causing any appreciable difference between these calculated current values and the values which would actually be measured by the use of ammeters. Returning now to our discussion of Case III, we find that one of the two paths through which the current will flow consists of two of the balancing resistors and the other consists of two resistors and two pilot wires. Consequently, the impedance of one path is only one-third of that of the other, the respective currents flowing will be in the ratio of three to one. Therefore, if we have a total of 10 amperes flowing, the current in one coil 24 of the relay 21 will be 7.5 amperes and the current in the other coil 23 will be 2.5 amperes. Thus, an unbalance exists in the relay and it will operate or be effective to open its associated breaker 13.

It might appear at first glance that there would be paths for the current through the ground pilot wire 54 and through the pilot wire 51 corresponding to the phase in which no current is flowing. However, a mathematical analysis of the circuit will show that these two additional shunt paths are connected between points of equal voltage, and, therefore, no current will flow in them.

It will also be noted that an unbalanced condition exists only in the relays 21 at the end 11 of the section 11—12 from which power is being fed to the fault point. The currents in the relay coils 23 and 24 at the other end of the section 11—12 are equal, although the respective direction of one, as referred to the other, is reversed. However, since the relay 21 consists of two separate coils 23 and 24 acting upon an induction disk 25, the torques tending to rotate this will still be equal and opposite in direction. Consequently, the disks 25 will not rotate, and the breaker at the end 12 of the section 11—12 will not be opened. This does not constitute an objection to this protective system, however, since, if there is no fault current fed from this end 12 of the section, there is no need for this breaker to open.

*Case IV. Distribution of currents for the case of a phase-to-phase fault in the section with unequal fault current fed from the two ends*

Case IV, which is represented by Fig. 8, illustrates the current distribution for a condition intermediate between those described in Cases II and III (Figs. 6 and 7). For the sake of convenience, it has been assumed that twice as much fault current is being fed from one end of the section 11—12 as from the other. The actual control current distribution will be similar to that shown in the diagram, Fig. 8, but since for this case, there are opposing voltages of unequal magnitudes at the two ends of the section 11—12, the distribution will be affected by these voltages. Since these voltages depend upon the characteristics of the current transformers 14, the exact distribution cannot be determined unless these characteristics are known. The values shown on the diagram may be considered as representative of an average case, however.

This case will serve to illustrate an important characteristic of the relay 21 which is advantageously utilized in this scheme. By referring to the diagram, Fig. 8, it is apparent that unbalanced conditions exist in the relays 21 at both ends of the section 11—12 and that the unbalance is greater at the end 11 of the section from which greater fault current is being fed than it is at the other end 12 of the section. However, the relative directions of currents in the two coils 23 and 24 of the relays 21 are not the same at both ends of the section. At the end 11, through which the larger fault current is flowing, the currents in the two coils of the relays 21 are in the same direction, while, at the other end, the currents are in opposite directions, in any one relay. As a result of this, the relays 21 at the two ends 11 and 12 of the section will operate in accordance with different characteristic curves. This may be clarified by reference to Figures 1 and 3. In Fig. 8, the control currents at the end 11 are in the same relative direction, and, at the end 12, they are in opposite directions. Fig. 3 shows the characteristic operating curves for the relay 21. These curves are plotted with the "smaller of the two coil currents" as abscissa and with the "amperes unbalance to close contacts" as ordinate. The current values shown apply for only one tap setting of the relay, but, by multiplying the values by the proper constants, the same curves could apply for any tap setting. It is evident from these curves that, when the relay is operating in accordance with curve A, a larger unbalanced current is required to close the relay contacts 26 than when it is operating in accordance with the curve B. When the current directions are as shown at the end 11 in Fig. 8, the relay will operate with the characteristics indicated by the curve A, and, when the current directions are as shown at the end 12 in Fig. 8, the relay will operate in accordance with the curve B. In the diagram of current distribution, which is Fig. 8, it will be evident that the relays 21 at the end 11 of the section which is feeding the greater amount of current to the fault will operate with the characteristics shown by curve A of Fig. 3. While the relays at the end 12 of the section from which the smaller fault current is being fed will operate with more sensitive characteristics, as shown by curve B. Since the unbalance existing in the relays is less at the end 12 of the section which feeds the smaller fault current, it is very desirable that the relays 21 at this end 12 should have the more sensitive characteristics. This feature of the relay, therefore, is utilized very advantageously in this system of protection.

*Case V. Distribution of currents for single-phase-to-ground-fault within the section and with equal currents fed from each end*

This case is represented by Fig. 9. The neutral balancing resistor 32, which is a novel and important feature of this protective system, has not entered into the four cases previously described. To illustrate the effect of this neutral balancing resistor 32 upon the control current distribution, two cases of ground faults will be described. The first case will be that of a single-phase-to-ground fault within the section 11—12 with equal currents fed from both ends, and the second case (described under Case VI, Fig. 10) will be that of a similar fault fed within an adjacent section, i. e., a "through" fault.

Since the voltages at the two ends of the ground pilot wire 54 and of the pilot wire 53 for the faulty phase are equal and opposite in direction for the case assumed above, no current will flow in either of these pilot wires. Consequently, the total secondary current will flow through only one coil 24 of the relay 21, and the breakers at both ends will open. As was previously stated, a ground relay 22 having lower current tap settings may be used on systems where the ground-fault current may be small or less than the minimum tripping value for the line relays.

*Case VI. Distribution of currents for case of a single-phase-to-ground in an adjacent section. See Fig. 10.*

The value of the neutral balancing resistor 32 will be apparent from the consideration of a fault in an adjacent section. By referring to the diagram, Fig. 10, it will be seen that the current divides so that the relays at both ends of the section 11—12 remain balanced. If the neutral resistor 32 were omitted, the currents would no longer divide equally between the two relay coils 23 and 24 and an unbalance would exist which would cause operation of the relays for a fault external to the section. Any attempt to adjust the resistors 31 in the individual phases in order to balance the relays for the through-fault condition assumed would result in an undesirable distribution of current for other fault conditions and would make it necessary that the sensitivity of the relays be decreased in order to prevent incorrect operation.

If the neutral balancing resistor 32 were omitted, the resistance of each of the remaining resistors 31 would have to be doubled in order to retain balanced conditions during an external phase-to-ground fault. As a result of this, twice as much current would flow over the pilot wires as through the balancing resistors under normal operating conditions. This would not cause incorrect operation but would place a resultant restraining torque on the relay which would decrease its sensitivity. That is, in order to cause operation, or to cause the contacts to close in the same time for both cases, the fault would have to be more severe if there were an over-balanced restraining torque on the relay under normal conditions. By utilizing the neutral balancing resistor 32, the restraining torque on the relays 21 may be maintained more nearly in balance with the operating torque and no over-balancing, with its consequent loss of sensitivity, will be required to maintain the effectiveness of the relay system under all possible conditions of "through" faults. The neutral balancing resistor 32 is, therefore, an important element in this scheme, and is essential to a correct and sensitive operation.

When a "through" fault current flows in the section 11—12 produced by a phase-to-phase fault in some other section, a circulating current flows in two of the phase pilot wires of the section 11—12 in the phases corresponding to the phase location of the fault, and the circulating control currents thus produced are circulated by a total of four current transformers 14 over the two phase pilot wires affected. But, when a phase-to-ground fault occurs in some other section of the power system, a relatively smaller value of current will flow in the faulty phase wire or conductor by reason of the relatively large impedance that is usually in the circuit under a ground-fault condition. The ground fault produces a circulating current in the section 11—12 between one phase pilot wire and the ground pilot wire and is propelled by only two current transformers 14 instead of the four current transformers, as was the case in the phase-to-phase fault.

Therefore, by reason of this difference in magnitude between the phase-to-phase "through" fault and the phase-to-ground "through" fault and by reason of the fact that the effects of the former are transferred to the control system by cooperation of double the number of current transformers, a distinction must be made in the two types of through faults and their effects upon the non-faulty section 11—12.

Heretofore, some of the circulating-current pilot-wire systems have been able to give correct balance or equal sensitivity for only one type of fault, i. e., either the phase-to-phase or the phase-to-ground type, but this protective system, by the utilization of the special impedance device 32 connected into the neutral, compensates for both types of "through" faults.

The purpose of the balancing resistors 31 and 32 is then essentially not only to split up the control currents with a predetermined definite balanced ratio between the two windings of the relay 21 but also to maintain that ratio when a ground fault occurs in some section of the power system other than in the non-faulty section, which by this protective system alone, is permitted to remain undisturbed.

One advantage of this protective system is that the volt-ampere burden upon the line-current transformers 14 is unusually low. The fundamental reason for the reduced volt-ampere burden on the line-current transformers 14 is that the control current from the transformers 14, divides in the relays 21 associated with them, one-half only of the control current passing out normally over the pilot wire, whereas, in the protective systems not using the method of divisional currents, all of the current must pass over the pilot wire, thus imposing a greater $I^2R$ or volt-ampere burden upon the current transformer associated with that particular pilot wire.

In this system, however, since the pilot wire carries substantially only one-half of the current from the transformer 14, it imposes only one-fourth the burden on the transformer, since, from the formula above, the volt-ampere burden varies as the square of the current. The balancing resistor imposes a like burden, thus making the total $$= \frac{I}{4} + \frac{I}{4}, \text{ or } \frac{I}{2}$$

of the burden imposed by a circulating-current system which does not employ this divisional-current scheme.

Another advantage is that high voltages across or in the secondaries of the current transformers 14 are avoided, because this particular system is a circulating-current system and further because of the utilization of the balancing resistors 31 and 32.

Another advantage is that the relays 21 may be so adjusted or set that an open circuit in the pilot-wire system will not cause a false operation and that only a fault condition will cause an actuation of the circuit interrupters. An open circuit in the pilot-wire system will not cause a false operation because the relay is so designed that, when only one coil is energized, the current required to cause the contacts to close must be equal to twice the tap setting used. Consequently, the relay may be so set that the normal load currents will not cause operation even though all of the current must flow through one coil of the relay, that is, the coil 23. However, this is not detrimental to the sensitivity of the relay because the relay will operate very rapidly at high values of current, such as would obtain on the occurrence of a fault.

Another advantage is that the balancing resistors 31 and 32 afford a means of obtaining a perfect balance of the relay system for any type of fault occurring outside the protected section, whether it be phase-to-phase or phase-to-ground, and that, to attain a satisfactory degree of balance, the resistors 31 and 32 need not be so precisely adjusted as in other pilot-wire schemes heretofore used. The reason that the resistors need not be adjusted so precisely is that small unbalances in the relay currents will not cause operation when normal load current is flowing.

Another advantage of this protective arrangement is that the current transformers 14 need not be exactly similar in characteristics at the two ends of any one line to be protected. Such differences in characteristics may be compensated for by adjustment of the balancing resistors 31 and 32.

Another advantage is that potentials induced in the pilot wires because of their proximity to the transmission line or because of lightning disturbances, or from other causes, will not cause false operation of the circuit interrupters 13, because the currents produced by such potentials must flow in series through the two coils of the relay. The current in one coil is then necessarily equal to the current in the other coil, and thus there is no unbalanced current and no actuation of circuit interrupters.

Another advantage is that this protective arrangement automatically becomes more sensitive to fault currents at the end of a faulty section in which flows the lesser value of such fault current. This is accomplished by utilization of the double-sensitivity relays which alter their sensitivity in accordance with the relative directions of the flow of circulating current in their windings.

Another advantage is that the balanced division of currents in a non-faulty section remains undisturbed when a through-fault current, produced by any type of fault in some other section of the power system, passes through the non-faulty section. This is accomplished by utilization of the neutral balancing resistors 32, which produce this result not accomplished by systems heretofore used.

Another advantage is that this protective system may be applied to relatively long lengths of power lines because the relay circuits have impedances of relatively small magnitude by reason of the fact that a part only and not all the current circulates over the relatively long pilot wires, the remaining part circulating over the relatively short balancing circuits in the local station.

I claim as my invention:

1. The combination in a pilot-wire protective system of the circulating-current type utilizing a differential relay, of a pilot wire, a relay balancing circuit including a neutral circuit, means for normally dividing the circulating current between the pilot wire and the relay balancing circuit, and a special impedance means connected to the neutral circuit.

2. In a protective system, the combination with a power line, circuit interrupters for isolating the power line, actuating means for the circuit interrupters, a pilot wire, a local balancing circuit containing a neutral circuit and a relay responsive to excess current in the balancing circuit relative to that in the pilot wire for controlling the circuit interrupter, of means connected to the balancing circuit for normally balancing the currents in the balancing circuit against those in the pilot wire comprising an impedance device associated with the relay and another special impedance device connected in the neutral circuit.

3. In a protective system, the combination with a power line, circuit interrupters for isolating the line, actuating means for the circuit interrupters, means for obtaining current proportional to the line current, a pilot wire associated with the line and a local balancing circuit of a normally balanced device connected to the balancing circuit and the pilot wire and responsive to excess current in the balancing circuit for controlling its associated circuit interrupter and means for imparting to the normally balanced device a dual sensitivity depending upon the relative directions of the flow of current in the balancing circuit and in the pilot wire.

4. In a protective system of the circulating-current pilot-wire type, the combination with a power line having circuit interrupters for isolating the line, actuating means for the circuit interrupters, means for obtaining a pilot wire current proportional to the line current, a pilot wire associated with the line and a local balancing circuit, of means for normally dividing the pilot wire currents equally between the pilot wire and the balancing circuit comprising a line or phase impedance device connected in series-circuit relation with a neutral impedance device, and means responsive to an excess current in the balancing circuit for controlling its associated circuit interrupter.

5. In a protective system, the combination with a power line or conductor in a power system having circuit interrupters adapted, when operated, to isolate or cut out the power line, and current transformers having their primaries connected to the power line and their secondaries connected to a pilot-wire system of the circulating-current type, of a relay comprising an operating winding responsive to an unbalance in the division of the pilot-wire current for controlling its associated circuit interrupter and a restraining winding connected to its associated pilot wire for opposing the actuation of the circuit interrupter, and means comprising a line impedance device and a neutral impedance device connected in series relation with each other for balancing the effects of the relay operating coil to normally substantially equalize the effects of the relay restraining coil.

6. In a protective system, the combination with a power line, circuit interrupters adapted, when operated, to isolate the line from the rest of the power system, current transformers connected to each conductor of the power line near both of its ends, their secondaries being connected in star connection with the neutral connection brought out, a ground pilot wire connected to the neutral connection, a pilot wire associated with each conductor, a relay for controlling its associated circuit interrupter arranged normally to equally divide the currents from the current transformers between the pilot wire and a balancing circuit, and means in the balancing circuit for balancing the divided currents, of an impedance device connected between the neutral connection of the current-transformer secondaries and neutral connection of the last named means.

7. In a protective system, the combination with a section of a power line having a plurality of conductors, circuit breakers adapted, when operated, to control the connections of the power line to the rest of the power system, means having a neutral connection for obtaining a control current proportional in magnitude and direction to that in the power conductors, pilot wires associated with the line conductors, balancing circuits associated with each conductor, and means associated with each conductor for balancing the division of control currents between the balancing circuits and the pilot wires, of a special impedance device associated with the neutral connection and means responsive to the division of control currents for controlling the circuit interrupters.

8. In an electrical system, the combination with two interrupters each at opposite ends of a section and current transformers associated therewith for each phase conductor, of a differential double-winding relay, means including a conductor for connecting one winding in a relay at one end to the corresponding winding in the same phase relay at the other end of the section, and means including a resistor for connecting the other winding of each relay in a local circuit with its current transformer, each resistor being substantially equal to one-half of the pilot wire impedance, and a special impedance device connected to the neutral of the current transformers and to the neutral of the resistors.

9. In a protective system, the combination with a section of a polyphase power system, means in each phase for attaining a control current proportional to each phase current at each end of the section, a phase pilot wire and a balancing circuit associated with each phase and a ground pilot wire, of means for splitting the control current in each phase with a definite ratio between the phase pilot wire and the balancing circuit, and means for maintaining that ratio substantially constant when a through fault occurs.

10. In a protective system, the combination with a section of a polyphase power system, means in each phase for obtaining a control current proportional to each phase current at each end of the section, a phase pilot wire and a balancing circuit associated with each phase and a ground pilot wire, of means for normally dividing equally the current effects between the phase pilot wire and the balancing circuit, and means including a neutral balancing resistor for maintaining the division constant when a through fault occurs.

11. In a protective system for a section of a polyphase transmisison circuit adapted to transmit currents normally balanced between the phases of the circuit, relays at both ends of each phase of said section responsive to an unbalance of the normally balanced phase currents, means, including pilot conductors, for transmitting currents proportional to the currents in each phase and the residual current resulting from said unbalance, a relay at each end of said section responsive to said residual current, and means controlled by said relays for isolating said section.

12. The combination with a pilot-wire protective system associated with a power line in a power system, of a relay means for controlling the connections of the line to the rest of the power system, actuating and restraining windings for said relay means, means for normally dividing the circulating current between said windings, and means for imparting a dual sensitivity to said relay means depending upon the relative direction of current flowing in the two windings.

In testimony whereof, I have hereunto subscribed my name this 19th day of November, 1927.

HERBERT C. GRAVES, Jr.